United States Patent Office 3,475,498
Patented Oct. 28, 1969

3,475,498
PROCESS FOR PREPARING ETHYL BENZENE HYDROPEROXIDE
Chai Y. Choo, Westwood, N.J., assignor to Halcon International, Inc., a corporation of Delaware
No Drawing. Filed Mar. 3, 1965, Ser. No. 436,926
Int. Cl. C07c 73/06, C07b 3/00
U.S. Cl. 260—610                               3 Claims

ABSTRACT OF THE DISCLOSURE

Ethylbenzene is converted to ethylbenzene hydroperoxide in higher yield and with minimized by-product formation by liquid phase oxidation with molecular oxygen while maintaining the partial pressure of oxygen over the oxidation mixture at from 0.01 p.s.i.a. to 25 p.s.i.a.

---

This invention relates to an improved process for the preparation of ethylbenzene hydroperoxide via the liquid phase oxidation of ethylbenzene. More specifically, it relates to such improvements in the oxidation as will insure both a higher yield of hydroperoxide from ethylbenzene and a more efficient utilization of hydroperoxide in subsequent processes.

Ethylbenzene hydroperoxide (alpha-phenyl ethylhydroperoxide) has recently found several important new uses in oxidation chemical processes. For example, in the epoxidation of olefins to form olefin oxides, past technology has required either the use of chlorine to form an intermediate chlorohydrin compound or the use of strong oxidizing agents such as peracids. In the chlorine route expensive materials of construction are required in the processing units, hydrogen chloride is produced as an oftentimes unwanted by-product and the manufacturing steps are complicated and cumbersome. In processes using peracids, such as peracetic acid, extensive precautions must be taken to minimize the dangers of explosion. This adds considerable cost to the manufacturing plants for the olefin oxides.

Ethylbenzene hydroperoxide when used as an oxygen bearer in olefin epoxidation reactions obviates many of the inconveniences and costs of chlorine or peracid process routes. For example, no special materials of construction are required, the hazards of explosion are minimized and both no-by-product processes and styrene co-product processes are easily developed.

The objectives of this invention are to provide an improved process for the preparation of ethylbenzene hydroperoxide from ethylbenzene by molecular oxygen oxidations, to achieve higher yields of the hydroperoxide from the hydrocarbon, to minimize by-product formation in and by-product separation problems from the oxidate and to simplify the equipment and process steps involved in the oxidation.

It is a further objective to provide ethylbenzene oxidation techniques whereby the oxidate formed can be used in the epoxidation of olefinic materials without further purification or preparation, and to provide an oxidate which when used in such epoxidation processes will minimize by-product formation, yield loss, and residue formation.

In accordance with this invention, it has been discovered that the selectivity of an oxidation of ethylbenzene to its corresponding hydroperoxide is greatly increased by maintaining the effective partial pressure of oxygen over the liquid phase oxidation mixture at 0.01 p.s.i.a. to 25 p.s.i.a., preferably at a pressure between 0.05 p.s.i.a. and 10 p.s.i.a., and mostly desirably at a pressure between 0.1 p.s.i.a. and 4 p.s.i.a., that the formation of by-products such as acetophenone, alpha-phenylethanol and acids is markedly reduced and that thereby the yield of hydroperoxide from ethylbenzene is enhanced. Furthermore, it has been discovered that when using the oxidate prepared in a low oxygen partial pressure oxidation to epoxidize an olefin, less high boiling residue is formed, the epoxidation is simplified and they yield of epoxide based upon ethylbenzene is increased.

The effects of oxygen gas partial pressure on the selectivity of the ethylbenzene oxidation are surprising in that one skilled in the art would expect that an increase in oxygen partial pressure would either have no effect upon selectivity or would improve selectivity. It has been discovered that the contrary is true. As Example I shows, as the effective partial pressure of oxygen over the liquid phase is decreased the amounts of such by-products as acetophenone, alpha-phenylethanol and acids are decreased; at oxygen partial pressures lower than 0.1 p.s.i.a. no further decrease in by-product formation is obtained.

In order to indicate more fully the advantages of the present invention, the following illustrative example is set forth. Unless otherwise indicated, all parts and percents are parts and percents by weight.

EXAMPLE I

Flash-distilled liquid ethylbenzene in the amount of 2.5 kg. was placed in a glass lined autoclave of 1 gallon capacity, and air was introduced below the surface of the liquid and near a mechanical stirring device which insured rapid and intimate mixing of the air with the ethylbenzene. The autoclave was equipped with a reflux condenser through which effluent gases were removed.

Samples of the reaction mixture were taken at the end of each run and analyzed for hydroperoxide content by the well known iodometric method, and for by-product acids by titrating with sodium hydroxide. Analyses for acetophenone and alpha-phenylethanol were made by the infrared absorption method.

The oxygen concentration of the gas leaving the reactor during the oxidation was kept constant by manipulation of the air feed rate.

The following table presents the results obtained in several runs at varying oxygen partial pressure. All oxygen partial pressures are in p.s.i.a.

TABLE I

| | Reaction tempera- ture, °C. | Reaction time, hours | Total system pressure, p.s.i.a. | Vent oxygen partial pressure | Concen- tration of ethyl- benzene hydro- peroxide, g. mole/ kg. | Moles of undesirable by-product per 100 moles of ethylbenzene hydroperoxide in the oxidate | | |
|---|---|---|---|---|---|---|---|---|
| | | | | | | Acid | Aceto- phenone | Alpha- phenyl ethanol |
| Run No.: | | | | | | | | |
| 45 | 150 | 3.7 | 164.7 | 22 | 0.90 | 5.2 | 15 | 13 |
| 17 | 150 | 3.0 | 74.7 | 7 | 0.93 | 3.4 | 12 | 11 |
| 29 | 150 | 2.7 | 114.7 | 1 | 0.89 | 1.3 | 12 | 8 |
| 13 | 150 | 2.5 | 39.7 | 1 | 0.91 | 1.3 | 11 | 8 |
| 41 | 150 | 3.0 | 39.7 | 0.2 | 0.80 | 0.9 | 12 | 7 |
| 38 | 140 | 6.5 | 64.7 | 8 | 0.94 | 2.9 | 13 | 11 |
| 39 | 140 | 5.9 | 34.7 | 2.9 | 0.90 | 1.8 | 12 | 9 |
| 71 | 140 | 4.9 | 34.7 | 0.2 | 0.87 | 0.6 | 8 | 8 |

The selectivity of the ethylbenzene oxidation depends primarily upon the effective oxygen partial pressure, that is the oxygen partial pressure in the vent gas leaving the ethylbenzene, when the reaction is carried out in a well-stirred, batch reactor. Control of this partial pressure may be achieved by manipulation of the total reactor pressure, the oxidation gas feed rate and the feed oxygen concentration. It can be seen (see Table I, runs 29 and 13) that neither the total pressure nor the feed oxygen partial pressure have any effect upon the selectivity of the oxidation to hydroperoxide. The yield advantage is greater as the oxygen partial pressure is decreased but below 0.1 p.s.i.a. little advantage is achieved.

The rate of hydroperoxide formation increases moderately as the effective oxygen partial pressure is increased. However, with oxygen partial pressures in the range of 0.2 to 8 p.s.i.a., little or no effect upon rate is discernible.

Any oxygen-bearing gas may be used in this process providing that the gases other than oxygen are inert at the reaction conditions. Air is the preferred oxidation gas because of its ready availability but gases richer or poorer in oxygen than air may be used with equal facility.

The reaction pressure may be maintained at from atmospheric to 1000 p.s.i.g., although the pressure is desirably maintained at from 10 p.s.i.g to 200 p.s.i.g. The oxidation of ethylbenzene is exothermic and it is, of course, necessary that some heat be removed. It is most desirable to operate at the adiabatic pressure, that is the pressure at which all of the excess heat produced in the reaction is removed as latent heat of vaporization in boiled-up hydrocarbons since there is no requirement for cooling coils or water jacketed reaction vessels or other types of heat removal apparatus; nor is there any net heat requirement once the reaction mixture is brought to temperature and initiated. The adiabatic pressure depends upon the temperature of the reaction, the amount of feed gas, the reactant feed temperature, the degree of ethylbenzene conversion, etc. and thus cannot be specifically defined except in relation to these variables. When operating at this pressure, all of the heat of reaction is removed in an overhead vent condenser wherein the boiled up hydrocarbons are condensed and returned to the reaction vessel.

The amount of ethylbenzene that should be converted in any oxidation depends upon several competing factors. As the conversion is increased above 15 to 17% of the feed ethylbenzene, the amount of by-product increases rapidly and the yield of hydroperoxide is consequently decreased. Where the conversion is less than about 5%, the cost of oxidizing a fixed amount of ethylbenzene is greatly increased due to the requirements of additional ethylbenzene recycle.

The temperatures at which ethylbenzene is oxidized by this improved process are 125° to 165° C., the preferred range is 130° to 160° C., and it is most desirable to operate in the range 135° to 160° C. At temperatures less than 125° C., the rate of reaction is so low as to require large expensive equipment; at temperatures in excess of 165° C. the reactions which form the several by-products are promoted and there is an attendant loss in selectivity.

Ethylbenzene may be oxidized in any standard equipment used in oxidation processes; the oxidation can be carried out batchwise or continuously with equal facility. A stainless steel or glass-lined vessel equipped with inlet and outlet taps for both liquid and vapor, a pressure control on the vent gas line, an agitator and an ordinary temperature control scheme have been used in the investigations which lead to the discovery disclosed herein.

It is of considerable importance in oxidizing ethylbenzene by these methods to remove any water which either forms in the reaction or is introduced into the reactor via the raw materials. This water may be removed by decantation from the overhead vent condensate; it is unnecessary to use any more elaborate physical or chemical dehydration schemes although such schemes can be employed.

The time required to convert the desired 5 to 17% of the ethylbenzene is in the range of from ½ to 20 hours depending upon the temperature maintained in the reactor and the oxygen partial pressure.

A particular advantage of this discovery lies in the fact that no catalysts or other additives need be added to the ethylbenzene feed mixture in order to either catalyze the reaction or ensure a high selectivity to hydroperoxide.

It is possible to use the oxidate formed by this inventive process without further purification in the epoxidation of an olefinic compound. It may in some cases be advisable to remove unconverted ethylbenzene prior to the epoxidation step but this is not essential. When operating in this fashion, less epoxidation reactor volume is required but these savings are offset by the costs of distillation and separation equipment.

The following example illustrates the advantages to be gained in the epoxidation of an olefinic material with an ethylbenzene oxidate containing ethylbenzene hydroperoxide formed under conditions wherein the partial pressure of oxygen is maintained between 0.2 and 22 p.s.i.a.

Unless otherwise indicated, all parts and percents are parts and percents by weight.

EXAMPLE II 85 grams of ethylbenzene oxidate, 0.25 gram of molybdenum napthenate solution containing 12.5 milligrams molybdenum, and 17 grams of propylene were placed in a 150 cc. stainless steel vessel fitted with a thermocouple and a pressure gauge. The bomb was then sealed and placed in a bath at 110° C. for 2 hours. The bomb was then cooled and the reaction products were analyzed for propylene oxide, and for carbonaceous high boiling residue. This procedure was repeated using oxidates prepared under different oxygen partial pressures. The following table shows the results.

TABLE II

| Ethylbenzene oxidate from run no. | Effective partial pressure of oxygen in the ethylbenzene oxidation, p.s.i.a. | Propylene oxide yield: moles propylene oxide per 100 moles ethylbenzene hydroperoxide fed | Residue formation: grams residue per 100 grams ethylbenzene hydroperoxide fed |
|---|---|---|---|
| 45 | 22 | 74 | 14.0 |
| 38 | 8.0 | 75 | 9.4 |
| 39 | 2.9 | 77 | 7.1 |
| 71 | 0.2 | 30 | 4.3 |

It can be readily seen from the above table that significant yield advantages in the epoxidation step are achieved by using ethylbenzene oxidates prepared by the method of this invention. Furthermore, product separation problems caused by the residue are minimized.

The epoxidation using the ethylbenzene hydroperoxide is carried out in the presence of epoxidation catalysts which may be compounds of the following: Ti, V, Se, Cr, Zn, Nb, Ta, Te, U, Mo, Ta, W and Ra. The preferred catalysts are compounds of Mo, Ti, V, W, Re, Se, Nb and Te.

The amount of metal in solution used as a catalyst in the epoxidation process can be varied widely, although as a rule it is desirable to use at least 0.00001 mol and preferably 0.002 to 0.03 mol per mol of hydroperoxide present. Amounts greater than about 0.1 mol seem to give no advantage over smaller amounts, although amounts up to 1 mol or more per mol of hydroperoxide can be employed. The catalysts remain dissolved in the reaction mixture throughout the process and can be reused in the reaction after removal of the reaction products therefrom. The molybdenum compounds include the molybdenum organic salts, the oxides such as $Mo_3O_3$, $MoO_3$, molybdic acid, the molybdenum chlorides and oxychlorides, molybdenum fluoride, phosphate, sulfide, and the like. Hetero-polyacids containing molybdenum can be used as can salts thereof; examples include phosphomolybdic acid and the sodium and potassium salts thereof. Similar or analogous compounds of the other metals mentioned may be used, as may mixtures thereof.

The catalytic components may be employed in the epoxidation reaction in the form of a compound or mixture which is initially soluble in the reaction medium. While solubility will to some extent depend on the particular reaction medium employed, a suitably soluble substance contemplated by the invention would include hydrocarbon soluble, organo-metallic compounds having a solubility in methanol at room temperature of at least 0.1 gram per liter. Illustrative soluble forms of the catalytic materials are naphthenates, stearates, octoates, carbonyls and the like. Various chelates, association compounds and enol salts, such, for examples, as aceto-acetonates may also be used. Specific and preferred catalytic compounds of this type for use in the invention are the napthenates and carbonyls of molybdenum, vanadium, titanium tungsten, rhenium, niobium, tantalum and selenium. Alkoxy compounds such as tetrabutyl titanate and other like alkyl titanates are very useful.

Temperatures which can be employed in the epoxidation can vary quite widely depending upon the reactivity and other characteristics of the particular system. Temperatures broadly in the range of about —20° to 200° C., desirably 0 to 150° C., and preferably 50° C. to 120° C. can be employed. The reaction is carried out at pressure conditions sufficient to maintain a liquid phase. Although sub-atmospheric pressures can be employed, pressures usually in the range of about atmospheric to about 1000 p.s.i.g. are most desirable.

Olefinically unsaturated materials which can be epoxidized by ethylbenzene hydroperoxide include substituted and unsubstituted aliphatic and alicyclic olefins which may be hydrocarbons or esters or alcohols or ketones or ethers or the like. Preferred compounds are those having from about 2 to 30 carbon atoms, and preferably at least 3 carbon atoms. Illustrative olefins are ethylene, propylene, normal butylene, isobutylene, the pentenes, the methyl pentenes, the normal hexenes, the octenes, the dodecenes cyclohexene, methyl cyclohexene, butadiene, styrene, methyl styrene, vinyl toluene, vinylcyclohexene, the phenyl cyclohexenes, and the like. Olefins having halogen, oxygen, sulfur and the like containing substituents can be used. Such substituted olefins are illustrated by allyl alcohol, methallyl alcohol, cyclohexanol, diallyl ether, methyl methacrylate, methyl oleate, methyl vinyl ketone, allyl chloride, and the like. In general, all olefinic materials epoxidized by methods previously employed can be epoxidized in accordance with this process including olefinically unsaturated polymers.

The lower olefins having about 3 or 4 carbon atoms in an aliphatic chain are most advantageously epoxidized by the reaction with ethylbenzene hydroperoxide. The class of olefins commonly termed alpha-olefins or primary olefins are also epoxidized in a particularly efficient manner by this process. It is known to the art that these primary olefins, e.g., propylene, butene-1, decene-1, hexadecene-1, etc. are epoxidized with more difficulty than other forms of olefins, except for ethylene. Other forms of olefins which are more easily epoxidized are substituted olefins, alkenes with internal unsaturation, cycloalkenes and the like.

In the epoxidation, the ratio of olefin to ethylbenzene hydroperoxide can vary over a wide range. Generally, mol ratios of olefinic groups to hydroperoxide broadly in the range of 0.5:1 to 100:1, desirably 1:1 to 20:1 and preferably 2:1 to 10:1 are employed. Additionally, it is advantageous to carry out the reaction to achieve as high a hydroperoxide conversion as possible, preferably at least 50% and desirably at least 90%, consistent with reasonable selectivities.

The ethylbenzene hydroperoxide which reacts to epoxidize the olefin is itself substantially converted to alpha-phenyl ethanol.

In view of the foregoing disclosures, variations and modifications thereof will be apparent to one skilled in the art, and it is intended to include within the invention all such varations and modification except as do not come within the scope of the appended claims.

What is claimed is:

1. A process for preparing ethyl benzene hydroperoxide which consists of reacting, a mixture consisting essentially of ethyl benzene and molecular oxygen in the liquid phase at a temperature of 125° C. to 165° C. while maintaining the partial pressure of oxygen over the liquid phase of from 0.01 to 25 p.s.i.a.

2. The process of claim 1 wherein the oxygen partial pressure is from 0.1 to 10 p.s.i.a.

3. The process of claim 1 wherein the source of molecular oxygen is air, the reaction temperature is maintained from 0.5 to 20 hours and the total pressure from atmospheric to 1000 p.s.i.g.

References Cited

UNITED STATES PATENTS

| 2,661,375 | 12/1953 | Conner | 260—610 |
| 2,867,666 | 1/1959 | Erickson et al. | 260—610 |

BERNARD HELFIN, Primary Examiner

W. B. LONE, Assistant Examiner

U.S. Cl. X.R.

260—348.5